United States Patent [19]

Brands

[11] Patent Number: 4,865,195

[45] Date of Patent: Sep. 12, 1989

[54] SUPPORT OR STORAGE CASE FOR ALIGNING A MAGNETIC-TAPE CASSETTE

[75] Inventor: Mayke A. Brands, Soest, Netherlands

[73] Assignee: Polygram Internationl Holding B.V., New York, N.Y.

[21] Appl. No.: 309,964

[22] Filed: Feb. 9, 1989

Related U.S. Application Data

[63] Continuation of Ser. No. 198,678, May 25, 1988, abandoned, which is a continuation of Ser. No. 942,660, Dec. 17, 1986, abandoned.

[30] Foreign Application Priority Data

Dec. 17, 1985 [NL] Netherlands ............................ 8503463

[51] Int. Cl.⁴ ............................................ B65D 85/672
[52] U.S. Cl. ..................................... 206/387; 360/134
[58] Field of Search ................. 206/387, 493; 360/134

[56] References Cited

U.S. PATENT DOCUMENTS

| | | | |
|---|---|---|---|
| 3,876,071 | 4/1975 | Neal et al. ............................. | 206/387 |
| 3,990,574 | 11/1976 | Roccaforte ............................ | 206/387 |
| 4,231,474 | 11/1980 | Takahashi ............................. | 206/387 |
| 4,322,000 | 3/1982 | Struble ................................ | 206/387 |
| 4,365,713 | 12/1982 | Ekuan .................................. | 206/387 |
| 4,368,817 | 1/1983 | Temesvary ......................... | 206/387 X |
| 4,428,482 | 1/1984 | Ogawa .............................. | 206/493 X |
| 4,457,928 | 7/1989 | Saito ................................ | 206/387 X |
| 4,576,345 | 3/1986 | Kohen et al. ....................... | 242/198 |
| 4,651,876 | 3/1987 | Tanuma et al. ...................... | 206/387 |

Primary Examiner—Bryon P. Gehman
Attorney, Agent, or Firm—David R. Treacy

[57] ABSTRACT

A storage case (13) is intended for a magnetic-tape cassette of a type comprising a housing (1) having a U-shaped slide (7) which is arranged on the outside of the housing (1) so as to be slidable along a bottom wall (2) with a main portion (7) and along two facing side walls (4,5) of the housing (1) with two side portions (7b,7c). The side portions (7b,7c) extend from the main portion (7a) up to substantially half the height of the side walls (4,5). In a closed position of the cassette a rear edge of the side (7) which faces a rear wall (9) of the housing (1) is spaced from the front of raised portions (2a) of the bottom wall (2) and the side walls (4,5) so that in the closed position a slot (10) is formed in the housing (1), between the front of said raised portions (2a) and the rear edge of the slide (7) which slot extends over the entire width of the bottom and up to substantially half the height of the side walls (4,5). The slot (10) is situated at a shorter distance from the rear wall (9) than from a front wall (6) of the housing (1). The storage case (13) comprises a bottom section (14) and a cover section (15). In the storage case (13) above the bottom section (14) at least one positioning element (22,23) is provided which when a cassette is present in the storage case (13) engages at least a part of the slot (10) and thereby unambiguously defines the position of the cassette inside the storage case (13).

17 Claims, 8 Drawing Sheets

SUPPORT OR STORAGE CASE FOR ALIGNING A MAGNETIC-TAPE CASSETTE

This is a continuation of application Ser. No. 198,678, filed May 25, 1988, which is a continuation of application Ser. No. 942,660, filed Dec. 17, 1986, now abandoned.

BACKGROUND OF THE INVENTION

The invention relates to a storage case for a magnetic-tape cassette of the type comprising a housing having U-shaped slide arranged on the outside of the housing, with a main portion slidable along the bottom wall of the housing; with two side portions, which extend from the main portion up to substantially half the height of the side wall, slidable along two facing side walls of the housing. The rear edge of the slide which faces the a rear wall of the housing is spaced from the front of protruding or raised portions of the bottom wall and the side walls in a closed position of the cassette, so that in the closed position of the slide a slot is formed in the housing between the front of said raised portions and the rear edge of the slide. In its longitudinal direction the slot extends parallel to the rear wall over the entire width of the bottom and up to substantially half the height of the side walls, and is situated at a shorter distance from the rear wall than from the front wall of the housings. Such a storage case comprises a bottom section and a cover section.

A magnetic-tape cassette of the type defined in the opening paragraph is described in EP-A-0,162,487, to which U.S. Pat. No. 4,576,345 corresponds, and is intended for recording and/or reproducing digitally encoded signals, in particular audio signals, on a magnetic tape. In this compact magnetic tape cassette the U-shaped slide has an important function, which is specifically aimed at effectively closing the housing against the penetration of contaminants. Owing to its construction and other properties this magnetic-tape cassette with the magnetic tape contained therein is suitable for use as an information carrier for signals whose characteristics are comparable to those recorded on optically readable audio discs of the Compact-Disc type. The compact construction renders this magnetic-tape cassette suitable for use in magnetic-tape equipment intended for a wide variety of consumer applications where it is desirable that the cassette can be removed from the storage case with one hand and placed it into the apparatus. Further, it is desirable that during this operation the cassette is removed from the storage case in an unambiguously oriented manner, so that the user can insert the cassette directly from the storage case into the apparatus without any additional manipulation. This is important for example when the cassette is to be used in mobile magnetic-tape equipment such as cassette-players mounted in cars.

SUMMARY OF THE INVENTION

It is the object of the invention to provide a storage case for a magnetic tape cassette of the type defined in the opening paragraph, the cassette occupying an unambiguously defined orientation inside the case once it has been placed into this case.

To this end the invention is characterized in that at least one stationary positioning element is provided in the storage case above the bottom section which element when the cassette is present in the case engages at least a part of the slot and thereby unambiguously defines the orientation of the cassette inside the storage case.

The presence of the positioning element on the bottom section of the storage case ensures that the cassette always engages the positioning element with the same part of the slot, so that the cassette always occupies the same position inside the case. This enables the cassette to be removed from the case with one hand and to be inserted into the apparatus without taking it into the other hand. For example, when the storage case is used in a car it enables the user to remove the cassette "blindly" and insert it into the apparatus without paying special attention. The unambiguous orientation inside the storage case further has the advantage that inside the case the upper side of the magnetic-tape cassette always faces the upper side of the storage case. In practice, this upper side of the cassette is the only side which is suitable for applying a label specifying data on the contents of the cassette. The unambiguous orientation thus ensures that the label always faces upwards inside the storage case, so that the label can always be read when the cover section is opened, while the lower side of the cassette, which is less suitable for applying a label, faces the bottom section of the case.

The engagement of the positioning element in the slot between the slide and the fixed portions of the cassette housing provides an additional latching of the slide. Although the latching slide is kept in the closed position by means of a latch arranged on the housing it may be advantageous to provide additional latching of the slide inside the storage case, for example in view of shocks which may occur during transport or when the storage case should fall.

It is to be noted that it is known per se from GB-A 2,105,306 to use a positioning element in the bottom section of a storage case to position a magnetic-tape cassette in the storage case. In this known storage case the positioning element engages a winding-spindle opening in the bottom of the cassette. This positioning element is not suitable for use with a magnetic-tape cassette of the type described in the forgoing, provided with a slide which closes the winding-spindle openings.

A preferred embodiment of the invention is characterized in that the positioning element engages that part of the slot which is situated between a side portion of the slide and the adjoining protruding or raised portion of one of the side walls of the housing. Since the side walls of the magnetic-tape cassette of said type have no local interruption above the side portions of the slide, so that the upper wall of the cassette housing is uninterrupted near the side walls, the cassette, when in a position in which the upper wall faces downwards, abuts against the positioning element with its upper wall, which effectively prevents the cassette from being inserted into the storage case in this position. The arrangement of the positioning element near the side walls of the cassette housing further has the advantage that the bottom section of the storage case can be flat over the larger part of its surface area, which is favourable for example when an insert card is to placed against the inner side of the bottom section.

In this respect another preferred embodiment of the invention is characterized in that the positioning element comprises a projection which extends substantially perpendicularly to the bottom section and which fits at least substantially between said side portion and the protruding or raised portion of the side wall. Since the projection at least substantially fits said part of the slot the cassette is effectively retained inside the storage case at the location of the projection, which prevents it from moving inside the storage case.

In this respect a further embodiment of the invention is characterized in that two positioning elements constituted by two projections are arranged above the bottom section. The projections are each situated near a side wall of the bottom section. As a result of the presence of two such projections a displacement of the cassette inside the case relative to the bottom section is at least substantially impossible.

Also in this respect another embodiment of the invention is characterized in that the two projections are situated near portions of the side walls of the bottom section which are lowered relative to the bottom section. Providing the two projections near lowered portions of the side walls of the bottom section implies that the cassette is always gripped substantially at the location of that part of the side walls where the projections are situated. This enables the cassette to be easily moved over the projections during insertion.

A further preferred embodiment of the invention is characterized in that the positioning elements are arranged on a separate insertion plate which rests on the bottom section. The use of a separate insertion plate, which is preferably clamped inside the bottom section, enables the use of an insert sheet or card which covers the full width of the bottom section, because the bottom section does not carry any projections. Further, when the insertion plate is not transparent it conceals the underside of the bottom wall of the cassette housing. Thus, the bottom of the cassette housing is not visible, which is favourable for the appearance of the storage case with the cassette contained therein.

In another preferred embodiment of the invention the positioning elements form a unit with the bottom section. Thus, the positioning elements can be manufactured cheaply, simultaneously with the bottom section.

In this respect a further preferred embodiment is characterized in that the two projections each directly adjoin a side wall of the bottom section of the storage case. By making the projections directly adjoin the side walls these walls are additionally reinforced at this location, and furthermore the free space on the bottom section between the projections is as large as possible. This is also important because it enables an as large as possible insert sheet to be inserted into the bottom section.

Another preferred embodiment of the invention is characterized in that the storage case further comprises a grip which projects from the bottom section and which in the closed position of the cover section adjoins this section and is situated at the outside of the case. The presence of a grip, which is preferably profiled, enables the user to determine "blindly" which is the upper side and the front side of the storage case, thus ensuring that after opening of the case the cassette is removed from the case in the correct position.

In this respect a further preferred embodiment is characterized in that the grip forms part of the insertion plate. This has the advantage that the design of the storage case resembles that for the afore-mentioned Compact Disc, so that the user can readily see that this concerns a digitally recorded information carrier. Thus, a storage case is obtained whose appearance resembles the packaging of the Compact Disc.

A further preferred embodiment of the invention is characterized in that the cover section carries supporting elements which retain a document such as an information card or leaflet on the cover section and which when the cassette is situated in the storage case are disposed in the direct proximity of an upper wall of the cassette housing. The supporting elements on the cover section thus have a double function. They serve for retaining a document, which may be a leaflet containing text, on the cover section, whilst the supporting elements can also preclude a movement of the cassette inside the casing in a direction perpendicular to the bottom section. In this way the cassette is effectively retained inside the storage case by the positioning elements and the supporting elements.

The invention further relates to the combination of such a storage case and a magnetic-tape cassette contained therein. The parts of this combination, comprising the storage case and the cassette, are oriented correctly relative to each other, which is important for a convenient handling and for the readibility of a label on the cassette.

Embodiments of the invention will be described in more detail, by way of example, with reference to the accompanying drawings.

DESCRIPTION OF THE PREFERRED EMBODIMENTS

Figure 1:
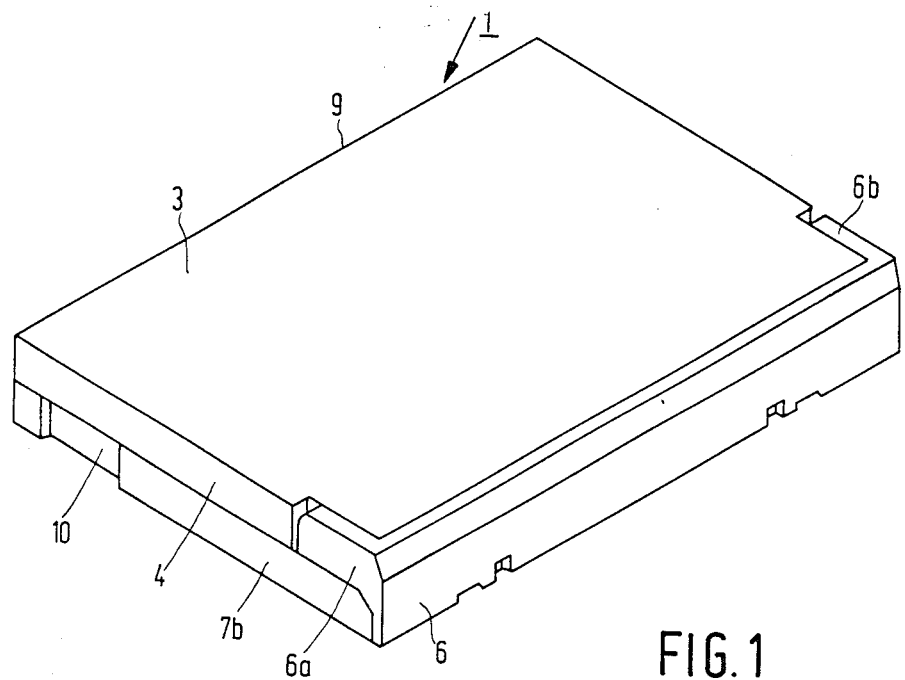
FIG. 1 is a perspective plan view of a magnetic-tape cassette intended for use in combination with the storage case in accordance with the invention.
Figure 2:
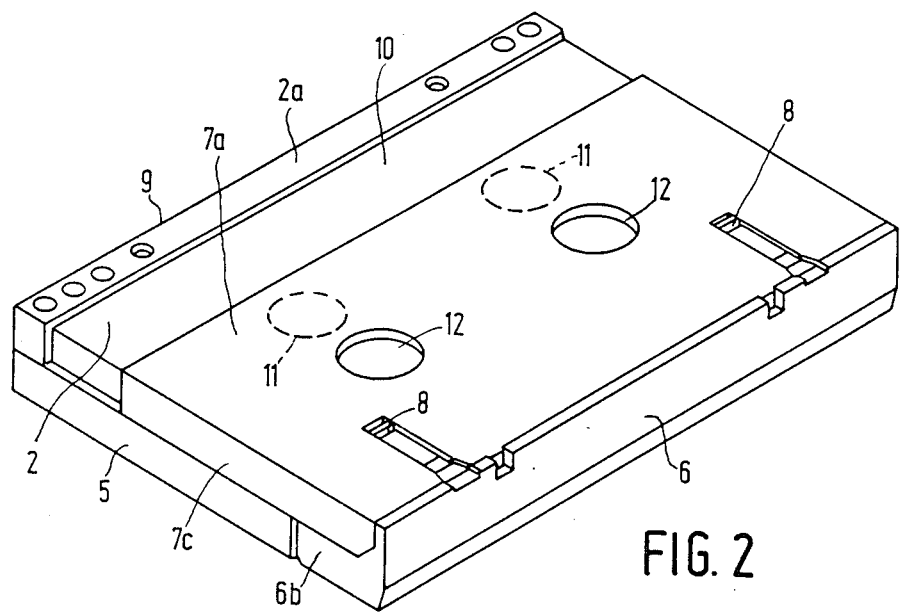
FIG. 2 is a perspective bottom view of the magnetic-tape cassette shown in FIG. 1.

The magnetic-tape cassette shown in FIG. 1 and 2 comprises a housing 1 having a bottom wall 2 and an upper wall 3. Further, it comprises two facing side walls 4 and 5 which for about one half belong to the same section of the housing to which the upper wall 3 belongs and for the remainder belong to the same section of the cassette housing to which the bottom wall 2 belongs. The separation between these housing sections is situated substantially halfway and distance between the bottom wall 2 and the upper wall 3. At the front the housing 1 is closed by a pivotable front cover 6, which shields a magnetic tape, not shown, and situated inside the housing, against the penetration of dirt and dust and against touching. Near the side walls 4 and 5 the front cover 6 comprises side flanges 6a and 6b by means of which the cover is pivotally connected to the housing. In the closed position the front cover 6 is latched by means of a U-shaped slide 7 which on the outside of the housing extends with a main portion 7a along the bottom wall 3 and which is guided along the two facing side walls 4 and 5 with two side portions 7b and 7c, respectively. The front cover 6 is latched in that the side flanges 6a and 6b engage against edges at the ends of the side portions 7b and 7c, respectively. In its turn the side 7 is latched by means of latching projections 8 in the housing. For a further description of the operation of the latching projections 8 and other parts of the cassette reference is made to EP-A 0,162,487 U.S. Pat. No. 4,576,345, herewith incorporated by reference). The side portions 7b and 7c extend from the main portion 7a up to substantially half the distance between the bottom wall 2 and the upper wall 3. Thus, in the closed position of the slide, as is shown in FIG. 2, a slot 10 is formed between a protruding or raised portion 2a of the bottom wall 2 and the rear edge of the slide which faces the rear wall 9 of the housing, the longitudinal direction of said slot extending substantially parallel to the rear wall 9 and being situated at a substantially shorter distance from the rear wall 9 than from the front cover 6. The slot 10 extends over the full width of the bottom wall 2 and continues in the side walls 4 and 5 between the slide rear edge and sideways protruding or raised portions 2b of the bottom section of the side walls 4 and 5 up to substantially half the height of the side walls. It is to be noted that the remaining parts of the side walls 4 and 5, as shown in FIG. 1, are not interrupted at the side of the upper wall 3 so that the upper wall 3 has an uninterrupted shape at least at the rear part of the cassette housing.

The slide 7 serves for closing the winding-spindle holes 11 formed in the bottom wall 2. In the open position, not shown, of the slide 7 openings 12 formed in the main portion 7a of the slide are in register with the openings 11 through which winding spindles can be inserted into the cassette to drive the magnetic tape reels. Thus, in the closed position the slide 7 closes the winding-spindle openings 11 to prevent the penetration of dirt and dust. Further, in a manner not shown the slide 7 indirectly exerts pressure on braking means which keep the tape reels in a latched position to prevent the tape from being unwound.

The storage case

Figure 3:
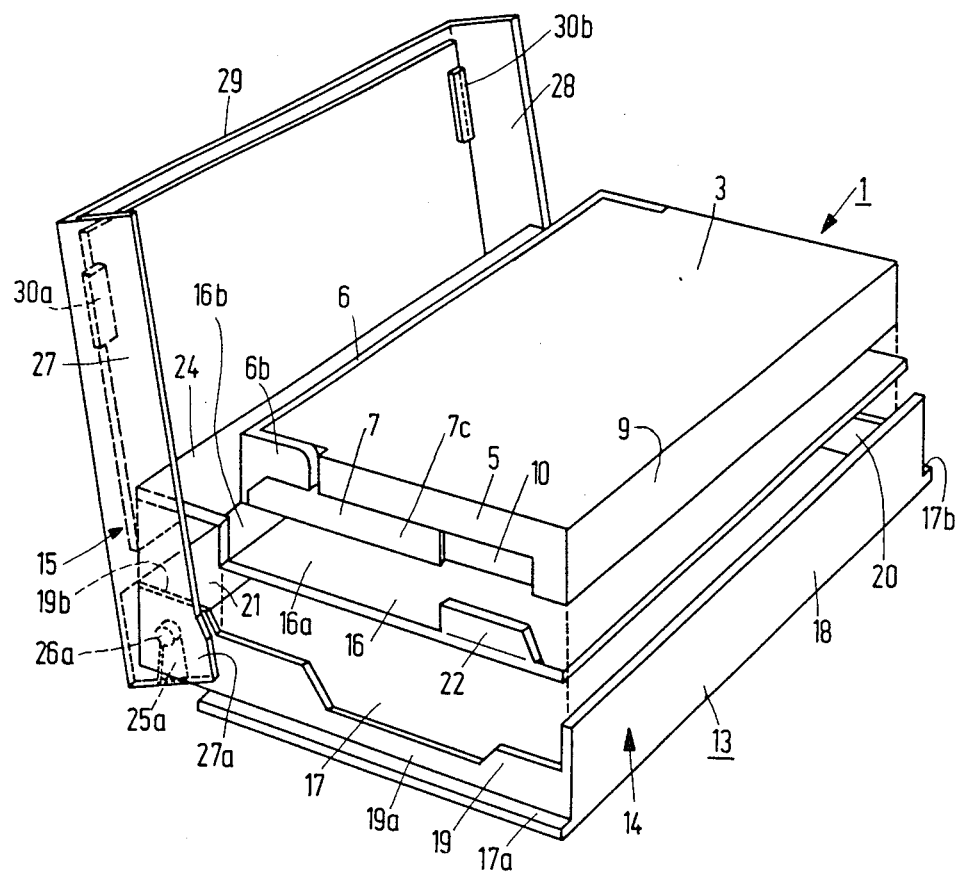
FIG. 3 is an exploded view of the storage case in accordance with the invention and the associated magnetic-tape cassette, the cover section being shown in the open position.

FIG. 3 shows the magnetic-tape cassette of FIGS. 1 and 2 in combination with a storage case 13 in accordance with the invention, which is intended for use in conjunction with such a cassette. This storage case comprises a bottom section 14 and a cover section 15. An insertion plate 17 is clamped in the bottom section 14 in such a way that it is firmly attached to the bottom section. Clamping is effected by means of embossments and recesses in the bottom section and the insertion plate, the insertion plate being snapped into the bottom section during assembly. Suitably, the bottom section 14 and the cover section 15 are made of a transparent plastics, whilst the insertion plate 16 is made of an opaque plastics. This has the advantage that if the cassette is accomodated in the storage case 13 the bottom wall 2 of the cassette is not visible, whilst the upper wall 3 is visible, which upper wall may be provided with a label which specifies, for example, information on music which is prerecorded on the magnetic tape. As in apparant from FIG. 2, the bottom wall 2 is less suitable for applying a label because of the irregularities in the bottom wall, such as the openings 12 in the slide 7 and the latching projections 8.

Figures 4, 5, 6:
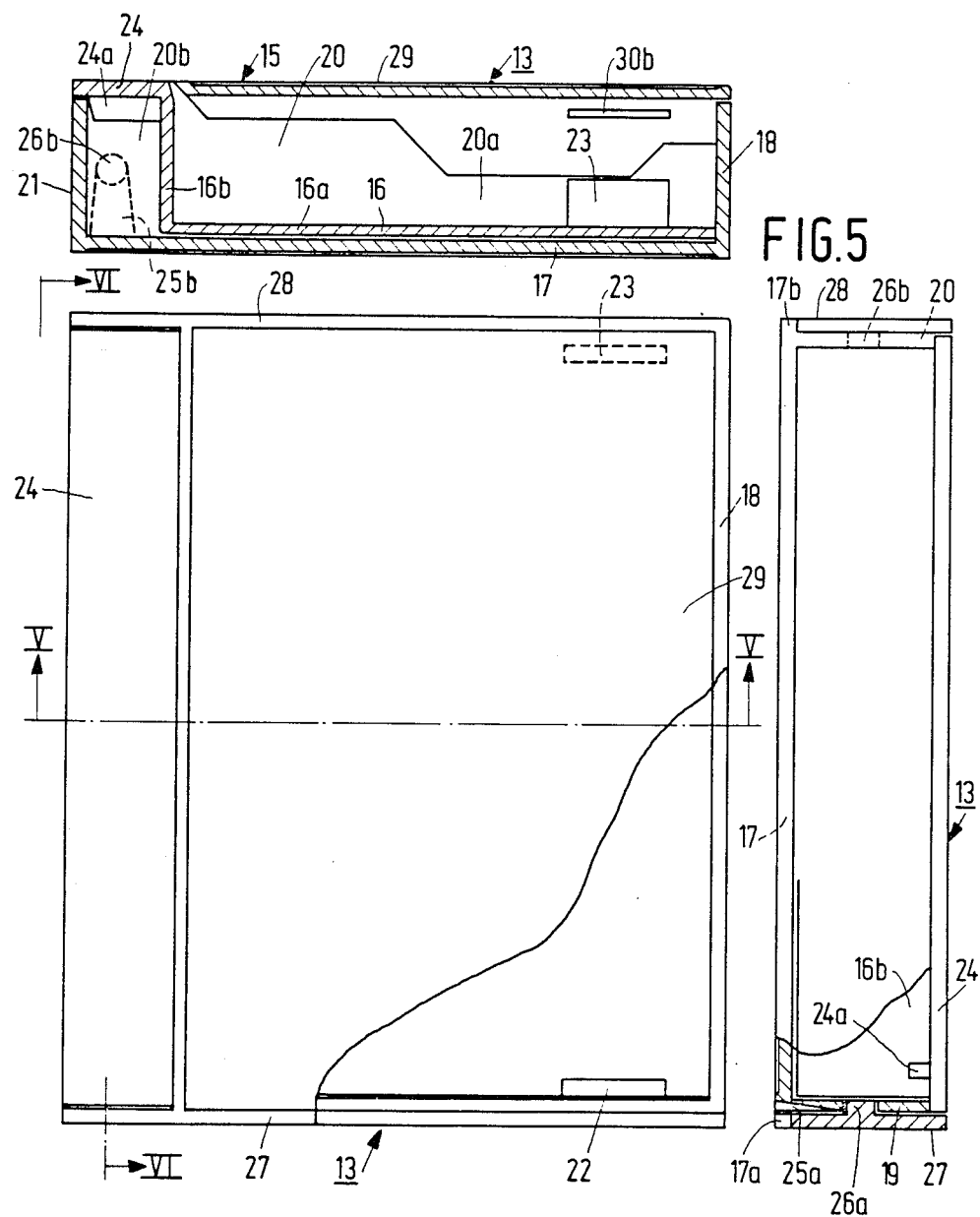
FIG. 4 is a partly cut-away plan view of the storage case of FIG. 3, shown to a different scale and with the cover section closed without a magnetic-tape cassette.
FIG. 5 is a sectional view taken on the lines V—V in FIG. 4.
FIG. 6 is a partly sectional view taken on the lines VI—VI in FIG. 4.

As can also be seen in FIGS. 4 to 6 the storage case 13 comprises a rectangular bottom wall 17 and an upright rear wall 18. As is visible in FIG. 5, this rear wall extends over substantially the full height of the case 13. The bottom wall 17 comprises lateral edges 17a, 17b which are disposed outwardly from the side walls 19 and 20 and which extend from the rear wall 18 in a forward direction to adjoin a front wall 21 of the bottom section 14. The side walls 19 and 20 comprise portions 19a and 20a (see FIG. 5) which adjoin the rear wall 18 and which have height which is slightly smaller than half the height of the rear wall 18. After the insertion plate 16 has been fitted its basic portion 16a substantially adjoins the side walls 19 and 20. This basic portion 16a also has a rectangular circumference. The basic portion 16a may lie against the bottom wall 17 but it is advantageous to insert an insert card or the like between the basic portion and the bottom wall 17a, the card being folded at right angles near the front wall 21 and having a short part extending parallel to the front wall 21. For the sake of clarity the insertion card is not shown. Two positioning elements are arranged on the basic portion 16a and comprise projections 22 and 23 which extend perpendicularly to the basic portion 16a. As is shown in FIG. 5, these projections are situated at least partly at the location of recessed portions 9a and 20a, the height of the projections 22 and 23 substantially corresponding to the height of the portions 19a and 20a. As is shown in FIG. 4, the projections 22 and 23 directly adjoin the inner sides of the side walls 19 and 20.

Near the front wall 21 the side walls 19 and 20 comprise raised portions 19b, 20b, which extend substantially up to the same height as the rear wall 18. Between the raised portions 19b and 20b the insertion plate 16 comprises a grip 24 which is situated on the outside of the case 13. The grip 24 is ribbed so that it can be held more conveniently. Between the grip 24 and the basic portion 16a the insertion plate comprises an upright wall portion 16b, which as is shown in FIG. 5, extends substantially perpendicularly to the grip 24 and the basic portion 16a. Thus, the wall portion 16b adjoins the basic portion 16a at the front and constitutes a front abutment for a cassette housing 1 of a cassette contained in the storage case. In this respect it is important that the parts of the slot 10 in the side walls 4 and 5 have such dimensions and are located in such a way relative to the projections 22 and 23 that during insertion of the cassette the side walls of the slot engage over the projections 22 and 23. In order to further facilitate insertion of the cassette the projections 22 and 23 may comprise slightly bevelled edges. In this respect it is important that in accordance with the invention the cassette housing 1 can rest in only one way on the basic portion 16a in the bottom section 14. This is possible because the slot 10 is disposed asymmetrically inside the housing 1, namely at a shorter distance from the rear wall 9 than from the front cover 6. Thus, the cassette is effectively retained in the bottom section 14 between the projections 22 and 23 in an unambiguously defined manner, the projections also precluding a movement of the slide 7 of the bottom wall 2 when the storage case 13 is subjected to shocks or other impact forces, for example when the storage case falls. In this respect it may be advantageous that the front cover 6 is just clear of the wall portion 16b, so that in the event of shocks the front cover 6 is not excessively loaded.

The underside of the grip 24 may be provided with reinforcement ribs 24a which adjoin the wall portion 16b and which may also perform a function in clamping the afore-mentioned insert sheet, not shown, against the front wall 21.

In the outer surface of each projection 19b,20b, a wedge-shaped groove 25a, 25b is formed which guides a hinge pin 26a, 26b on the cover section 15 towards a hinge opening formed in the raised portion 19b,20b. The wedge-shaped groove 25a,25b allows the hinge pins to engage simply and easily in the hinge openings. The hinge pins 26a and 26b are arranged on the inner sides of the side walls 27 and 28 of the cover section 15. These side walls extend over the entire width of the bottom section 14 and in the closed position of the storage case they bear against lateral edges 17a and 17b, respectively. In order to allow the cover section 15 to be hinged the edges 17a and 17b terminate at some distance from the front wall 21. As is shown in FIG. 3, the side wall 27 may adjoin the edge 17a with a portion 27a. Near the edge 17b the side wall 28 may have a similar shape. In the closed position of the storage case an upper wall 29 extends between the side walls 27 and 28 from the rear side of the rear wall 18 up to a short distance from the grip 24 (see FIG. 5). In this way it is achieved that the grip 24 is accessible at the outside of the case 13. The inner sides of the side walls 27 and 28 carry two supporting elements 30a and 30b, respectively, which extend parallel to the side walls 27,28 over some distance and which serve for retaining a document such as an information card or an information leaflet specifying the music recorded on the magnetic tape. After closure of the cover section the supporting elements 30a and 30b perform another function because the supporting elements are situated at a minimal distance from the upper wall 3 of the cassette when the cover section 15 is closed so that in the upward direction the cassette is also effectively retained inside the storage case 13.

As already stated, the cassette housing 1 is oriented in the storage case in an unambiguously defined manner by means of the projections 22 and 23. If the user wishes to open the storage case the storage case can be brought into a convenient position by means of the easy to see grip 24, the cover section 15 can be swung open, and subsequently the cassette can be removed from the case with the same hand to insert it into a magnetic-tape apparatus in the correct position. Thus, the user can "blindly" remove a cassette, which is for example an advantage for use in cars. It may also be an advantage for other uses. Furthermore, it is always ensured that the cassette is situated in the storage case with the label on the upper wall 3 facing upwards, so that the label is easy to see. Moreover, this is advantageous for the appearance of the cassette; with the construction in accordance with the invention the cassette with the associated storage case has an attractive appearance. The case also provides enough possibilities for inserting information cards or leaflets. This is important because the dimensions of such a cassette intended for recording and reproducing digital signals are small and not much space is available for inserting information cards and the like.

It is to be noted that between the bottom section and the cover section snap mechanisms may be provided, which ensure that in the closed position the cover section correctly adjoins the bottom section and in the open position it remains open in the correct position. By a suitable choice of the shape of the portion 27a of the side wall it is possible to limit the pivotal movement of the cover section 15. For example, after a pivotal movement through 180° the side walls 27 and 28 may abut against the ends of the edges 17a and 17b. This may be advantageous, for example, in order to prevent a leaflet situated between the supporting elements 30a and 30b from slipping out of the cover section, whilst in addition this limitation makes the storage case even more convenient to handle.

Figure 7:
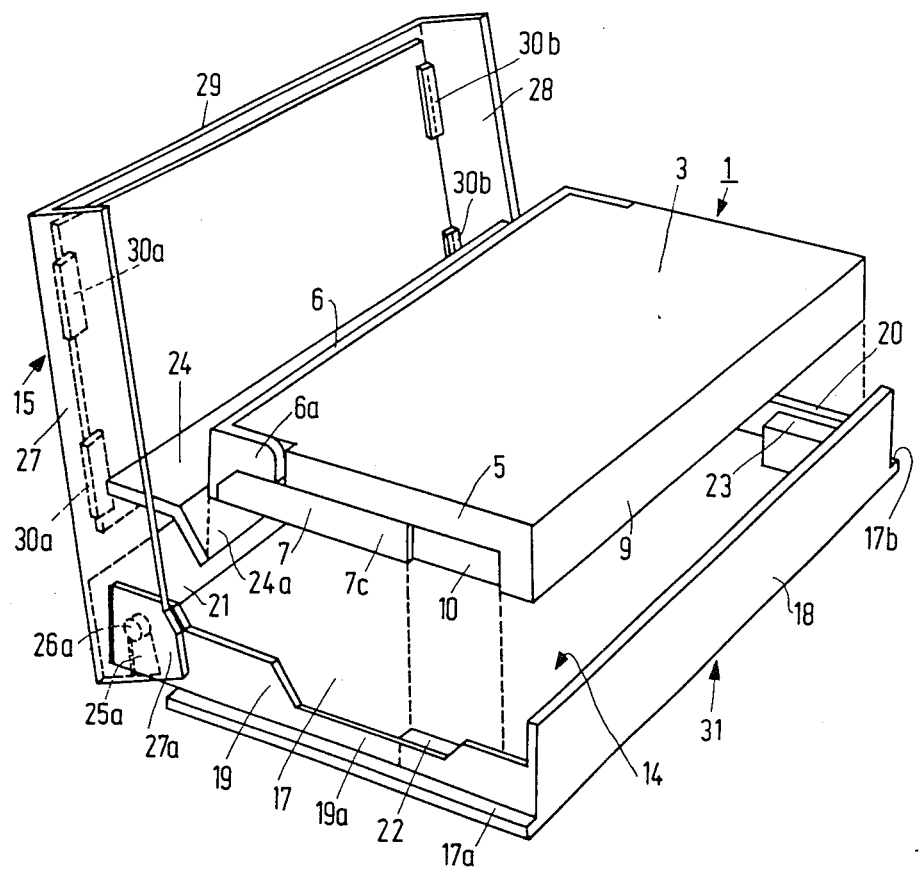
FIG. 7 is an exploded view of a second embodiment of the invention and an associated magnetic-tape cassette with the cover section shown in the open position.

The embodiment shown in FIG. 7 is a storage case 31 which comprises many parts corresponding to those of the storage case 13 in the first embodiment. Therefore, corresponding parts bear the same reference numerals. A different feature in this embodiment is that the grip 24 is mounted as a loose insert and the insertion plate 16 is dispensed with. In the present embodiment the projections 22 and 23 are formed directly on the bottom wall 17 and may be formed integrally with the side walls 19 and 20.

The grip 24 comprises a portion 24a which extends up to the proximity of the bottom wall 17. This portion 24a not only serves for positioning the cassette in the storage case but also for retaining an insertion card or sheet on the bottom section, which card should have a recess at a location of the projections 22 and 23 in the embodiment shown in FIG. 7. Injection-moulding the projections 22 and 23 together with the bottom section 14 has the advantage that this embodiment can be comparatively cheap. In this embodiment the insert on the bottom wall 17 may serve to cover the bottom wall 2. It is to be noted that alternatively a strip may be formed on the bottom wall 17 between the projections 22 and 23. This strip may engage the slot 10 as a positioning element, thereby additionally positioning the cassette inside the case 31. Suitably, such a strip may also be formed on the insertion plate 16 in the preceding embodiment, in which case the strip does not hinder insertion of an insert sheet between the cassette and the bottom wall 17.

Figure 8:
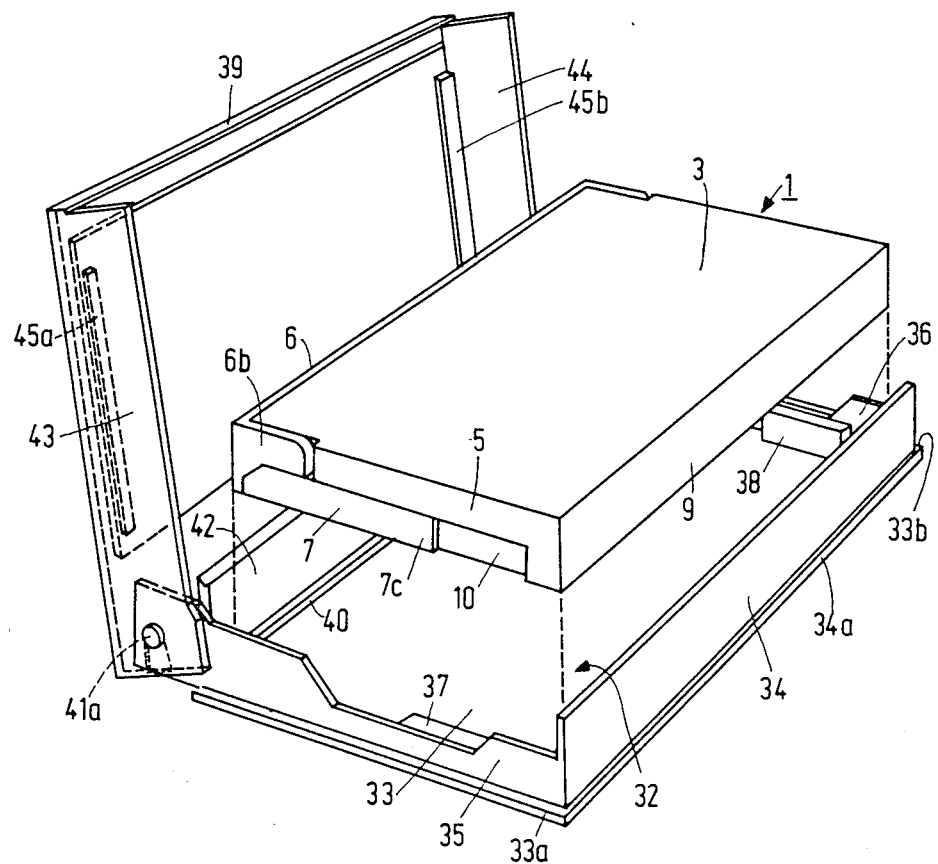
FIG. 8 is an exploded view of a third embodiment of the invention and an associated cassette with the cover section shown in the open position.
Figure 9:
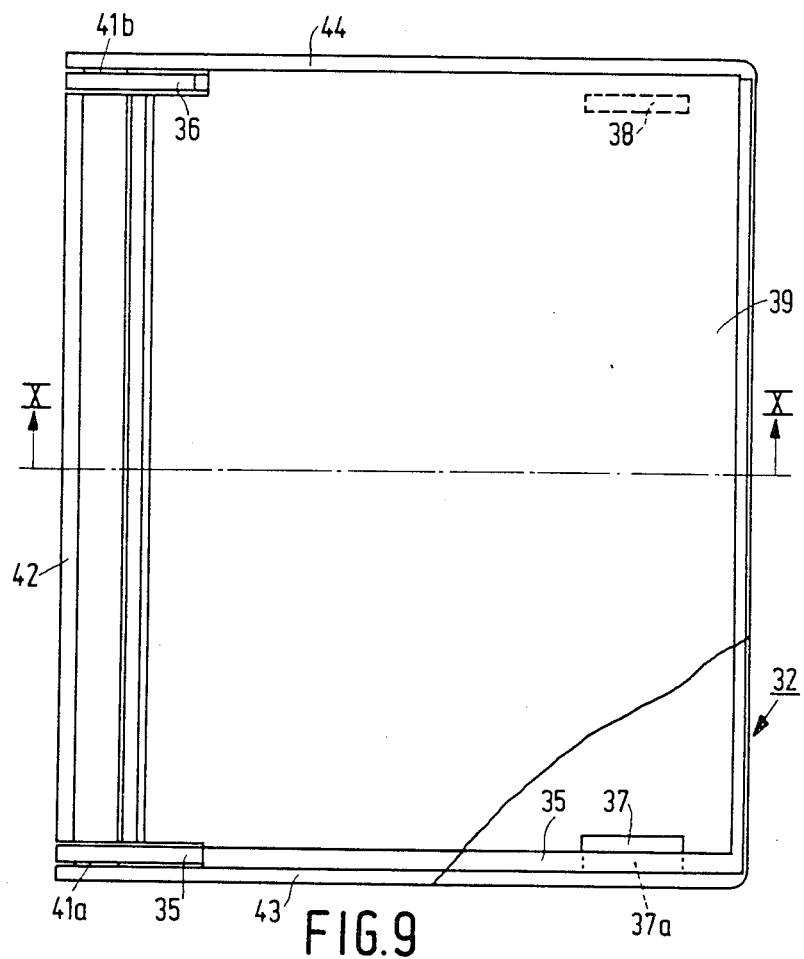
FIG. 9 is a partly cut-away plan view of the storage case of FIG. 8 shown to a different scale and with the cover section closed and without a magnetic-tape cassette.
Figure 10:
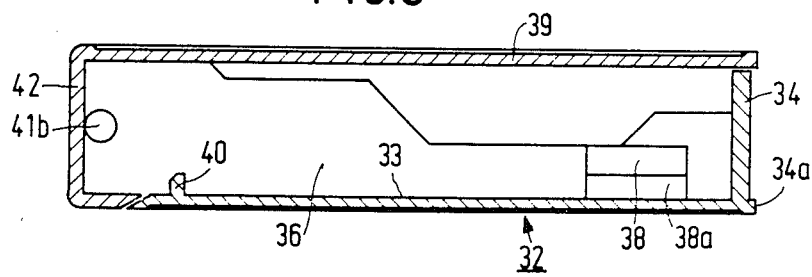
FIG. 10 is a sectional view taken on the lines X—X in FIG. 9.

FIGS. 8 to 10 show a storage case in accordance with a third embodiment of the invention, which storage case 32 comprises only two parts. The case 32 comprises a bottom wall 33, rear wall 34 and upright side walls 35 and 36 which largely correspond to the walls 17 to 20 in the first embodiment. At some distance above the bottom wall 33 two positioning elements 37 and 38 are arranged, comprising projections which are connected to said side walls 35 and 36 respectively above the recesses 37a and 38a in the walls 35 and 36 respectively.

The recesses 37a and 38a are formed for reasons of injection-moulding technique. By arranging the projections 37 and 38 at some distance above the bottom wall a free space on the bottom is obtained for example for an insert card. In order to facilitate opening of the case a projecting rear edge 34a is formed between the edges 33a,33b adjoining the rear wall 34. As a result of this, the rear wall 34 slightly recedes, so that the upper wall 39 of the cover section slightly projects to a point behind the rear wall 34. In order to retain the cassette effectively inside the storage case 32 a positioning ridge 40 is formed on the bottom wall 33 (see FIG. 10). As can also be seen in FIG. 10, the bottom wall 33 does not continue up to the front but terminates at some distance from a hinge pin 41a,41b which, like the hinge pins 26a,26b, engages a hinge opening in the side walls 35 and 36, respectively. The cover section comprises a U-shaped front portion 42 which, when the cover is closed, adjoins the bottom wall 33 at its underside. As is shown in FIGS. 8 and 9, the side walls 43 and 44 of the cover section are situated at the outside of the case, whilst the front portion 42 is situated between the side walls 35 and 36. In these embodiments the side walls 43 and 44 also carry supporting elements 45a and 45b for retaining an information card or leaflet. At the location in the front portion 42 this card may be folded, so that viewed at the front of the case the front wall is also covered at the inside. The card is effectively enclosed by the front portion 42. In the third embodiment the front portion 42 may be formed with a ribbed surface so that the front portion can also function as the grip of the storage case. In this embodiment the storage case comprises only two parts, so that this storage case can be manufactured cheaply. In this embodiment it is also preferred to arrange an insert card between the bottom wall 33 and the cassette to conceal the bottom wall 2 of the cassette.

Figure 11:
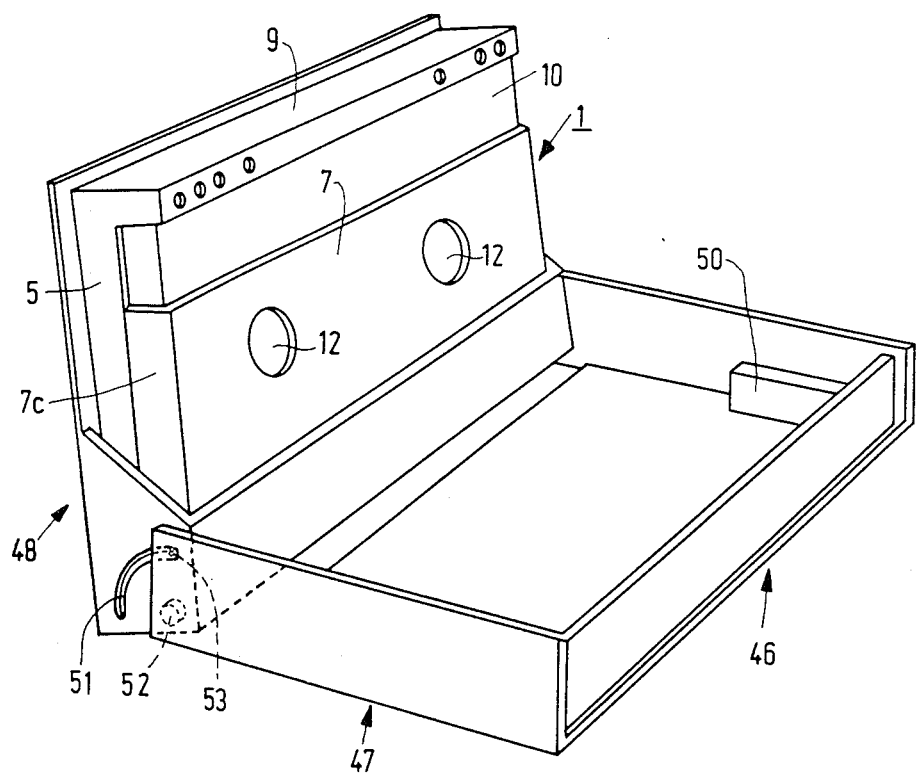
FIG. 11 is an exploded view of a fourth embodiment of a storage case in accordance with the invention and an associated cassette with the cover section shown in the open position.
Figure 12:
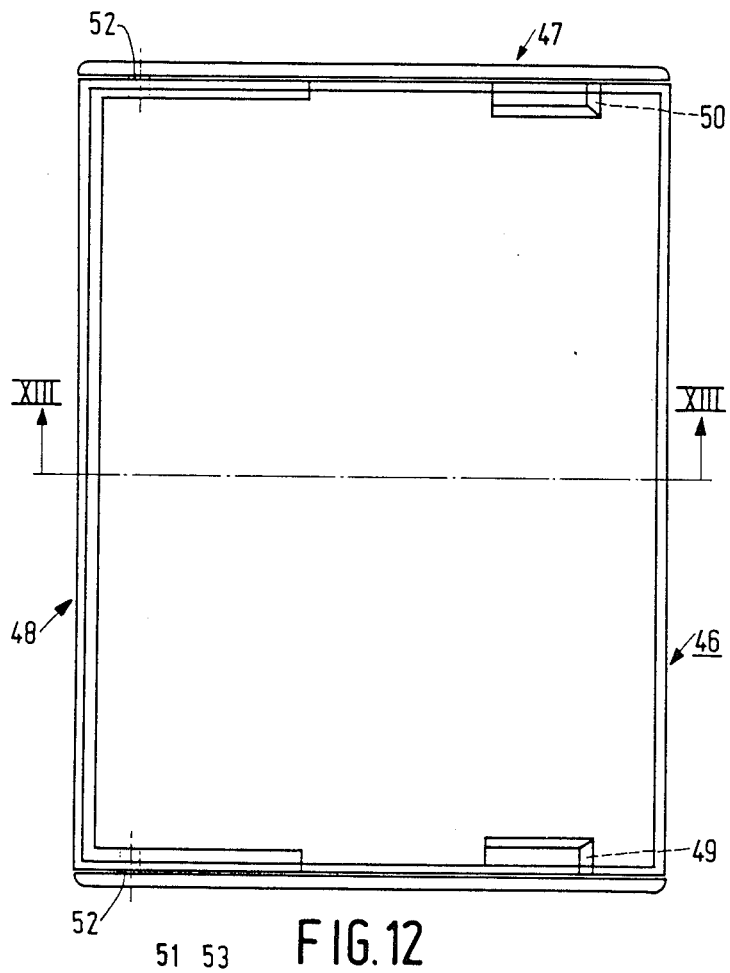
FIG. 12 is a plan view of the storage case of FIG. 11 shown to a different scale with the cover section closed and without a cassette.
Figure 13:
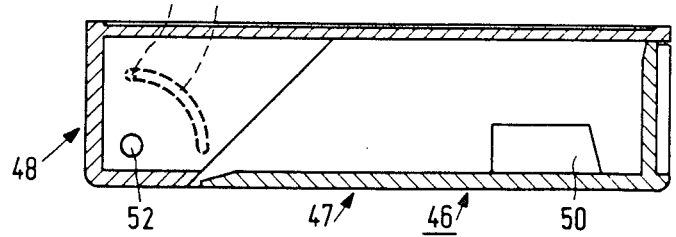
FIG. 13 is a sectional view taken on the lines XIII—XIII in FIG. 12.

In the embodiment shown in FIGS. 11 to 13 a storage case 46 is used which slightly resembles the embodiment shown in FIGS. 8 to 10, but in which the cassette is inserted into a cover section 48 while again positioning elements 49,50 are arranged on a bottom section 47. The storage case 46 bears some resemblance to the storage case employed for the well-known Compact Cassette, the cover section functioning as a king of envelope which receives the cassette. The positioning elements 49 and 50 in this fourth embodiment again provide an unambiguous orientation of the cassette inside the storage case 46. In the cover section 48 an insert card may be inserted in the same way as is customary with the Compact Cassette. If the bottom wall is to be concealed the bottom section 47 should be covered by an insert sheet or the like. However, it is also possible to manufacture the bottom section from a non-transparent plastic. In this embodiment the projections 49 and 50 are also integral with the bottom section 49, so that the case 47 comprises only two parts. In order to prevent the cover section 48 from being opened too far and the cassette from falling out of the cover section, the side walls of the cover section 48 are formed with arcuate grooves 51 which are concentric with the hinge pins and which are engaged by pins 53 connected to the inner sides of the side walls of the bottom section 47.

What is claimed is:

1. A support, for a cassette of the type comprising
   a housing having a bottom wall having a given width, a rear wall and two side walls having a given height, said rear wall and side walls having protruding portions, said protruding portions extending outwardly from said bottom wall and parts of said sidewalls, parallel to said rear wall, and
   a U-shaped slide disposed on the outside of the housing, said slide having a main portion and two side portions, and being slidable along the bottom wall in a direction parallel to said bottom and side walls, said main portion and side portions having respective rear edges facing said protruding portions, and said side portions facing each other and facing the respective housing side walls; said slide being slidable between a closed slide position and another position,
   in the closed position the rear edges being spaced from the protruding portions, said rear edges and protruding portions defining edges of a slot in the housing extending in a longitudinal direction parallel to the rear wall over the entire given width of the bottom, and in a direction perpendicular to said bottom wall up to substantially half said given height,
   characterized in that said support comprises a basic portion for supporting such a cassette,
   means for unambiguously defining the orientation of such a cassette placed on the support, and
   projection means for engaging said slot of such a cassette properly placed on the support, said projection means consisting of one or more positioning elements extending from said basic portion and being the sole means for defining said orientation.

2. A support as claimed in claim 1, characterized in that at least one of said positioning elements engages in that part of the slot which is situated between a side portion of the slide and the adjoining protruding portion of one of the side walls of the housing.

3. A support as claimed in claim 2, characterized in that said at least one of said positioning elements comprises a projection which extends substantially perpendicularly to said basic portion and which fits at least substantially between said portion and the protruding portion of the side wall.

4. A support as claimed in claim 3, characterized in that said projection means consists of two said positioning elements, said elements being constituted by respective projections arranged to engage the slot portions defined by the respective side portions of the slide.

5. A storage case, for a cassette of the type comprising
   a housing having a bottom wall having a given width, a rear wall and two side walls having a given height, said rear wall and side walls having protruding portions, said protruding portions extending outwardly from said bottom wall and parts of said sidewalls, parallel to said rear wall, and
   a U-shaped slide disposed on the outside of the housing, said slide having a main portion and two side portions, and being slidable along the bottom wall in a direction parallel to said bottom and side walls, said main portion and side portions having respective rear edges facing said protruding portions, and said side portions facing each other and facing the respective housing side walls; said slide being slidable between a closed slide position and another position,
   in the closed position the rear edges being spaced from the protruding portions, said rear edges and protruding portions defining edges of a slot in the housing extending in a longitudinal direction parallel to the rear wall over the entire given width of the, bottom, and in a direction perpendicular to said bottom wall up to substantially half said given height, said case comprising a bottom section having a bottom wall for supporting such a cassette, and a cover section, characterized in that said case comprises means for unambiguously defining the orientation of such a cassette placed on said bottom wall, and projection means forming a unit with said bottom section, for engaging said slot of such a cassette properly inserted into the case, said projection means consisting of one or more positioning elements extending from said lower section and being the sole means for defining said orientation.

6. A case as claimed in claim 5, characterized in that the cover section carries supporting elements which retain a document such as an information card or leaflet on the cover section, and which when such a cassette is situated in the case are disposed in direct proximity to an upper wall of the cassette housing.

7. A case as claimed in claim 5, characterized in that at least one of said positioning elements engages in that part of the slot which is situated between a side portion of the slide and the adjoining protruding portion of one of the side walls of the housing.

8. A case as claimed in claim 7, characterized in that said projection means consists of two said positioning elements, said elements being constituted by two respective projections arranged to engage the slot portions defined by the respective side portions of the slide and in that said two projections each directly adjoin a side wall of the bottom section of the storage case.

9. A case as claimed in claim 7, characterized in that the positioning element comprises a projection which extends substantially perpendicularly to said bottom wall and which fits at least substantially between said side portion and the protruding portion of the side wall.

10. A case as claimed in claim 9, characterized in that the case further comprises a grip which projects from said bottom section, and which in a closed position of the cover sections adjoins the cover section and is disposed at the outside of the case.

11. A case as claimed in claim 9, characterized in that said projection means consists of two said positioning elements, said elements being constituted by respective projections arranged to engage the slot portions defined by the respective side portions of the slide.

12. A case as claimed in claim 11, characterized in that the cover section carries supporting elements which retain a document such as an information card or leaflet on the cover section, and which when such a cassette is situated in the case are disposed in direct proximity to an upper wall of the cassette housing.

13. A storage case comprising a bottom section, a cover section, and a support, for a cassette of the type comprising a housing having a bottom wall having a given width, a rear wall and two side walls having a given height, said rear wall and side walls having protruding portions, said protruding portions extending outwardly from said bottom wall and parts of said sidewalls, parallel to said rear wall, and a U-shaped slide disposed on the outside of the housing, said slide having a main portion and two side portions, and being slidable along the bottom wall in a direction parallel to said bottom and side walls, said main portion and side portions having respective rear edges facing said protruding portions, and said side portions facing each other and facing the respective housing side walls; said slide being slidable between a closed slide position and another position, in the closed position the rear edges being spaced from the protruding portions, said rear edges and protruding portions defining edges of a slot in the housing extending in a longitudinal direction parallel to the rear wall over the entire given width of the bottom, and in a direction perpendicular to said bottom wall up to substantially half said given height, characterized in that said support has a basic portion for supporting such a cassette, means for unambiguously defining the orientation of such a cassette placed on the support, and projection means for engaging said slot of such a cassette properly placed on the support, said projection means consisting of one or more positioning elements extending from said basic portion and being the sole means for defining said orientation, said positioning elements of the support protruding in an upwardly direction from said bottom section.

14. A case as claimed in claim 13, characterized in that said basic portion and said projection means are formed by a separate insertion plate which rests on the case bottom section.

15. A case as claimed in claim 14, characterized in that said projection means consists of two said positioning elements, said elements being constituted by respective projections arranged to engage the slot portions defined by the respective side portions of the slide and in that said two projections each directly adjoin a side wall of the bottom section of the storage case.

16. A case as claimed in claim 15, characterized in that the case further comprises a grip which projects from said bottom section, and which in a closed position of the cover section adjoins the cover section and is disposed at the outside of the case.

17. A case as claimed in claim 16, characterized in that the grip forms part of the insertion plate.

* * * * *